July 31, 1923.

J. W. SCHADE

TRANSMISSION BELT

Filed Aug. 14, 1922

1,463,596

Inventor
James W. Schade
By Robert M. Pierson
Atty.

Patented July 31, 1923.

1,463,596

UNITED STATES PATENT OFFICE.

JAMES W. SCHADE, OF AKRON, OHIO, ASSIGNOR TO THE B. F. GOODRICH COMPANY, OF NEW YORK, N. Y., A CORPORATION OF NEW YORK.

TRANSMISSION BELT.

Application filed August 14, 1922. Serial No. 581,628.

*To all whom it may concern:*

Be it known that I, JAMES W. SCHADE, a citizen of the United States, residing at Akron, in the county of Summit and State of Ohio, have invented a certain new and useful Transmission Belt, of which the following is a specification.

This invention relates to side-driving or V-type transmission belts of fabric and rubber construction for running on grooved pulleys, and its object is to provide a highly-flexible and durable belt adapted to be manufactured at a relatively-low cost.

Figure 1:
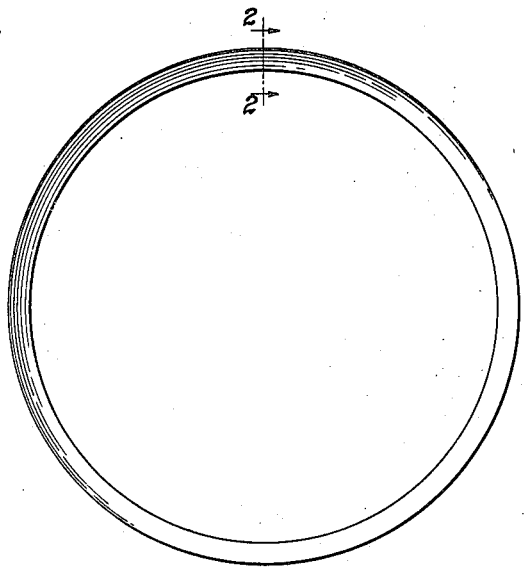

Of the accompanying drawings, Fig. 1 is a side elevation of an endless belt constructed according to my invention.

Figure 2:
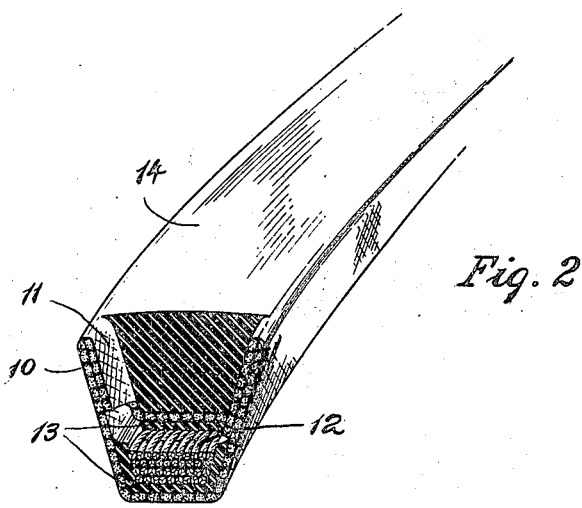

Fig. 2 shows a part of the belt in perspective, partly broken away, as viewed from a plane such as 2—2 of Fig. 1.

The body of the belt, in the preferred form here shown, includes a deep, laminated trough composed of two plies 10, 11 of bias, rubberized, square-woven fabric, forming nested individual troughs, the bottom of the inner one being separated by a considerable space from the bottom of the outer one, and in this space is located an inextensible band-core 12 composed, preferably, of a strip of rubberized, weak-wefted, thread fabric, wound into a plurality of convolutions with the warp threads running circumferentially. The core 12 is faced with layers of soft rubber 13 forming an embedding cushion for said core and also forming a binder which tends to prevent separation of the straight and bias-thread fabric elements and contributes to the flexibility of the belt.

14 is an annular, soft-rubber filler firmly vulcanized to the three inner sides of the inner, trough-shaped ply of bias fabric ply 11 and, in this instance, completely filling the outer space between the wings of the trough-shaped fabric body. This rubber filler is outwardly free or unconfined,—that is, it has no outer cover-ply of fabric. A substantially complete filling of this space, to a level about flush with the edges of the wings, provides a desirable degree of lateral stiffness to give the required wedging pressure and tractive grip of the belt sides against the flanges of the grooved pulleys without necessitating the use of a large number of thicknesses of fabric in the wings, while the omission of a cover-ply of fabric over the filler 14 increases the flexibility of the belt.

I have shown two plies of bias fabric 10, 11, but do not limit myself as to the number and might, for example, omit the inner ply. When two plies are used, the core 12 may have any desired, suitable relation to the inner ply. Details such as the shape of the outer surface of filler 14 and the construction of the core 12 are also subject to variation within the limits of my invention.

I claim:

1. A side-driving transmission belt comprising a trough of bias fabric, a substantially inextensible core within said trough, and an outwardly-unconfined body of rubber overlying said core and substantially filling the outer space between the wings of the trough.

2. An endless, side-driving transmission belt comprising a trough of bias, rubberized fabric, a core-band of longitudinally-extending threads within said trough, and an outwardly-free body of rubber overlying said core and substantially filling the outer space between the wings of the trough, all of said parts being vulcanized together.

In witness whereof I have hereunto set my hand this 20 day of July, 1922.

JAMES W. SCHADE.